United States Patent [19]
Stone

[11] 3,805,613
[45] Apr. 23, 1974

[54] LIQUID LEVEL INDICATOR
[76] Inventor: Leslie F. Stone, 1214 S. Haase St., Westchester, Ill. 60153
[22] Filed: July 29, 1971
[21] Appl. No.: 167,286

[52] U.S. Cl................................. 73/313, 338/33
[51] Int. Cl............................................. G01f 23/10
[58] Field of Search........... 73/313, 322.5; 338/151, 338/152, 33

[56] References Cited
UNITED STATES PATENTS
2,023,748   12/1935   Shipley .......................... 338/151 X
3,393,283   7/1968   Lenning.......................... 73/322.5 X
1,819,849   8/1931   Steams............................ 338/151 X FOREIGN PATENTS OR APPLICATIONS
511,067   8/1939   Great Britain..................... 338/156

Primary Examiner—Richard C. Queisser
Assistant Examiner—Daniel M. Yasich
Attorney, Agent, or Firm—John L. Hutchinson

[57] ABSTRACT

The present invention is directed to a means for continually determining or detecting the level of a liquid in a vessel. In brief, the invention involves the use of a flexible tube suspended in a U-shape within a liquid whose level is to be determined. One end of the tube is attached to a float and the other extends above the liquid surface to the top of the vessel. The tube contains a resistance wire having an insulated return section and a regular conductor, such as a copper wire. The resistance wire and its return section are connected externally to a source of power forming a circuit. A freely movable pool of mercury is also disposed within the tube providing a connecting circuit between the resistance wire and conductor. A voltmeter potentiometer circuit is established across the resistance wire through the bare conductor and mercury pool. As the tube is raised and lowered in the liquid by the float, the mercury will seek the lowest portion of the tube and thus effect the current flowing between the wires and, correspondingly, the meter reading. The meter can be calibrated to read in volume, feet, or other desired scale.

6 Claims, 4 Drawing Figures

PATENTED APR 23 1974 3,805,613

LIQUID LEVEL INDICATOR

DESCRIPTION OF INVENTION

It is a primary object of this invention to provide a device for readily detecting or measuring the level of a fluid in a vessel.

Another object is to provide a device of the foregoing type which is reliable and may be manufactured with minimum expense.

These and other objects will be apparent from the following description and associated drawing.

Figure 1:
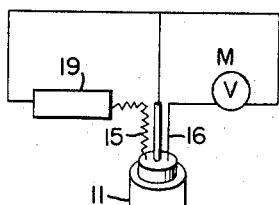

In the drawing, FIG. 1 is schematic view, partly in section, of the level detecting and measuring device.

Figure 2:
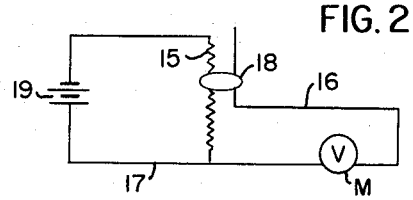

FIG. 2 is a schematic diagram of the electrical circuit used in the device.

Figure 3:
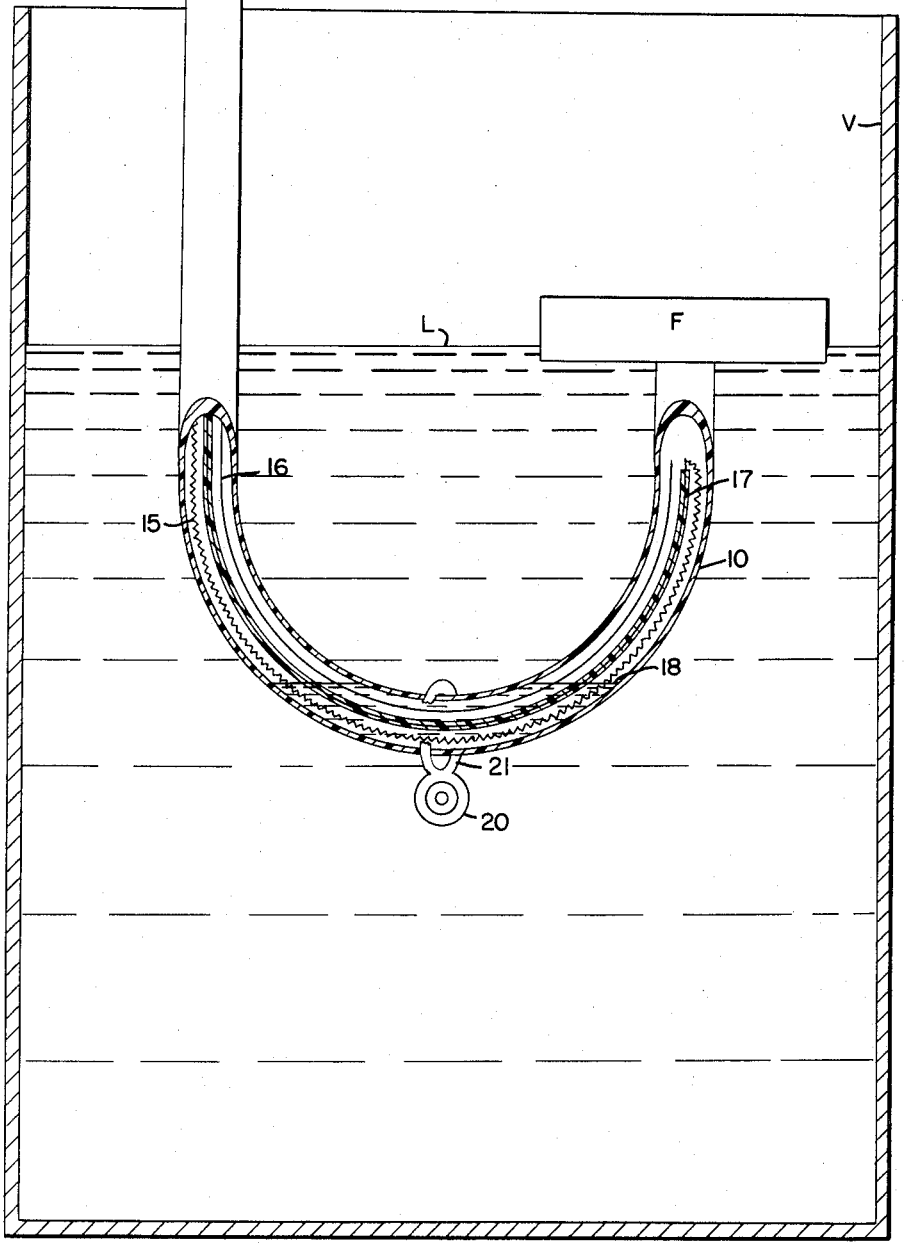
Figure 3:
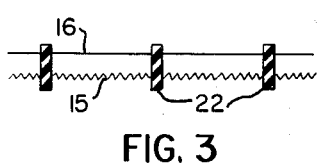

FIG. 3 discloses one modification of a wire assembly forming part of the electrical circuit.

Figure 4:
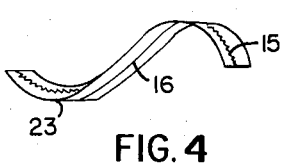

FIG. 4 discloses another modification of the wire assembly.

Turning now to the drawing and to FIG. 1, the numeral 10 designates a flexible tubing, which in use, will have most of its length disposed in a U-shape beneath the surface of a liquid L contained in a vessel V. The tubing should be made from a material which is inert and will not be affected by the liquid. Typical materials which may be used are rubber, polyethylene, polyvinylchloride, a halogenated polyolefin such as teflon, etc., depending upon the liquid to be tested. For most applications the tubing will have an internal diameter of from about one fourth to one half of an inch. Its length and wall thickness generally should be such that the tube is reasonably flexible to permit easy movement and formation of a U-shape within the liquid, as further described hereinafter.

Attached to one end of the tube is a float F which may be formed of plastic foam, rubber or the like. The float should be composed of a material which is inert to the liquid. The outlet end 11 of the tube projects from the top of the vessel V and may extend some distance beyond or over the edge of the vessel as necessary. As shown, the tube depending from the float will form a U when placed in a liquid.

Normally, the end of the tube attached to the float should be sealed to prevent entrance of liquid into the tube. However, for some applications the tube may extend up through the float and remain open or provided with an air vent closure.

Disposed within the tube is a resistance wire 15, which may be nichrome wire, a bare first conductor 16, such as a copper wire, and a second insulated conductor 17, which may also be a copper wire. Preferably, the wires should extend throughout the length of the tube to or substantially to the float F and may be connected to the float to hold them in position.

As shown, the resistance wire 15 and insulated conductor 17 are connected at their inner or float end of the tube; whereas the bare conductor 16 is disposed within the tube but is unattached to either of the other two wires and is spaced or insulated from the resistance wire.

Also disposed within the tube is a freely movable pool of mercury 18 which will move up and down within the tube as it seeks the lowest part of the U. The mercury will operate to form an electrical conductor between the resistance wire 15 and the bare conductor 16.

At the outlet end 11 of the tube the wires 15 and 17 are connected in a voltmeter-potentiometer type circuit with a suitable D.C. power source, such as battery 19. As illustrated in FIG. 2, disposed in parallel across the resistance wire 15 by means of conductor 16 and the mercury pool 18 is a voltmeter M. The voltmeter can be calibrated to read in feet, gallons, or other desired scale.

In order to insure that the tube is maintained within the body of a fluid or liquid to be tested, a suitable weight 20 may be employed. The weight can be attached to a ring 21 adapted to freely slide over the surface of the tube 10 and thus insure that the main body of the tube is formed with a U-shape within the liquid.

In operation the tube will be placed into a vessel containing a liquid to be measured whereby the tube will take a U-shape with float F resting on top of the liquid. The mercury pool 18 will then seek the bottom of the U and the meter M will indicate an initial reference or can be adjusted to read zero as may be desired. As the level of the liquid changes, the height of float F will also change to the same height as that of the top of the liquid level. Correspondingly, it will be seen that, as the position of the float changes, the position of the U-portion of the tube will also change. Likewise, as the U-portion of the tube changes, the mercury pool will change in seeking the lowest level within the tube.

The voltmeter indicator reading will vary in accordance with the relative position of the mercury pool within the tube. The closer the mercury pool within the tube is to the float the lower will be the meter reading and, conversely, the further away the pool is from the float the higher the meter reading. Thus, the device can be used to indicate or measure the level, volume, etc. of a fluid in a vessel depending upon the calibration of the voltmeter.

It will be appreciated that, to insure against faulty readings, the resistance wire 15 and bare second conductor 16 must be separated or insulated from each other. Such separation can be obtained by a variety of means as illustrated in FIGS. 3 and 4.

As shown in FIG. 3, the resistance wire and second conductor may be held in separated or spaced relationship within the tube by a plurality of insulators 22 disposed at spaced points between the two wires. The modification of FIG. 4 contemplates a non-conductive tape type carrier for the wires wherein the wires are disposed on opposite sides of the tape.

Having described the invention and certain exemplary embodiments thereof, the same is only intended to be limited by the scope of the following claims.

I claim:

1. A device for detecting the level of a liquid within a vessel comprising:

a. a flexible tube of sufficient length whereby there is continuously formed a freely movable, vertically extending, upwardly operating U-portion beneath the surface of the liquid from the highest to substantially the lowest level of the liquid, wherein one side of said U-portion will extend to substantially the surface of the liquid and the other side will extend above the surface of the liquid, b. the end on said one side of said tube extending substantially to the surface of the liquid and being attached to an element adapted to float on the surface of said liquid, c. a resistance wire disposed within and extending substantially the length of said tube,
d. a first conductor disposed within and extending substantially the length of said tube and insulated from said resistance wire,
e. said first conductor and resistance wire being connected at their inner ends within said tube,
f. a second conductor disposed within and extending substantially the length of said tube and insulated from contact with said resistance wire and said first conductor,
g. a pool of mercury within said tube in contact with both said resistance wire and said second conductor and freely movable throughout the length of said tube,
h. said resistance wire and said first conductor being connected through the other end of the tube in a circuit with a source of power external of said tube,
i. a voltmeter disposed in parallel across said resistance wire through said second conductor and said mercury pool, whereby the indicator of said voltmeter will be directly affected in accordance with the location of the mercury pool within said tube,
j. a slidable means around the tube, which means in combination with the conductors and the volume of mercury are of a sufficient weight so as to insure that the U-portion of the tube will remain beneath the surface of the liquid, the volume of the mercury being such as to insure its location at the bottom of the U-portion of the tube.

2. A device as described in claim 1 wherein said tube is sealed at the float end.

3. A device as described in claim 1 wherein said tube extends upwardly through said float and the end thereof is closed with a stopper provided with an air vent.

4. A device as described in claim 1 wherein said resistance wire and said conductor are attached to said floating element.

5. A device as described in claim 1 wherein said resistance wire and said second conductor are held in substantially parallel relationship through the tube by means of a plurality of spaced insulators.

6. A device as described in claim 1 wherein said resistance wire and said second conductor are disposed in opposite sides of a non-conductive strip.

* * * * *